United States Patent
Chen et al.

(10) Patent No.: US 9,609,101 B1
(45) Date of Patent: Mar. 28, 2017

(54) MOBILE DEVICE PROTECTION CASE

(71) Applicant: iRice Energy Technology(Shenzhen) Co., Ltd., Shen Zhen (CN)

(72) Inventors: Shih-Hui Chen, Taoyuan (TW); Chia-Sheng Liao, Taoyuan (TW)

(73) Assignee: iRice Energy Technology (Shenzhen) Co., Ltd., Shen Zhen (CN)

( * ) Notice: Subject to any disclaimer, the term of this patent is extended or adjusted under 35 U.S.C. 154(b) by 0 days.

(21) Appl. No.: 14/932,905

(22) Filed: Nov. 4, 2015

(51) Int. Cl.
*H04M 1/00* (2006.01)
*H04M 1/18* (2006.01)
*H04M 1/02* (2006.01)
*H04B 1/3888* (2015.01)

(52) U.S. Cl.
CPC .......... *H04M 1/185* (2013.01); *H04B 1/3888* (2013.01); *H04M 1/0202* (2013.01)

(58) Field of Classification Search
CPC .... H04B 1/3888; H04B 1/3883; H04B 10/11; H04M 1/185; H04M 1/0214; H04M 1/0202; H04M 1/0254; H04M 1/0249; H04M 1/026; H04M 1/0283; G06F 1/1681; G06F 2200/1633; G06F 2200/1634
See application file for complete search history.

(56) References Cited

U.S. PATENT DOCUMENTS

2012/0309475 A1 * 12/2012 Johnson .................. H04M 1/04 455/575.8
2013/0277084 A1 * 10/2013 McCarthy .............. A45C 11/00 174/50

* cited by examiner

*Primary Examiner* — Kwasi Karikari (57) ABSTRACT

A mobile device protection case includes a hard case body, and a flexible adapter member connected to one end of the case body and elastically bendable for allowing a mobile device to be inserted into the case body without scratching and then stopped in the case body by the adapter member that is immediately returned to its former shape after releasement of the applied pressure.

8 Claims, 10 Drawing Sheets

MOBILE DEVICE PROTECTION CASE

BACKGROUND OF THE INVENTION

1. Field of the Invention

The present invention relates to mobile device protection devices and more particularly, to a mobile device protection case, which is partially elastically deformable for easy insertion of a mobile device in the case body thereof without scratching.

2. Description of the Related Art

Conventional mobile device protection cases are generally composed of two mating case members. After insertion of a mobile device in between the two mating case members, the two mating case members are forced into engagement with each other to secure the inserted mobile device firmly in position. However, the two mating case members can easily be forced apart upon an accidental impact. Screws or other fastening members can be installed to lock the two mating case members together. However, the use of screws or other fastening members to lock the two mating case members together greatly complicate the use of the mobile device protection case.

There is known another prior art design of mobile device protection case, which comprises a hard back panel, and two guard flanges located at two opposite lateral sides of the hard back panel. In application, impart a pressure to the mobile device against the guard flanges to expand the guard flanges bilaterally outwards for allowing the mobile device to be closely attached to the surface of the hard back panel. After the mobile device is set in between the two guard flanges and closely attached to the surface of the hard back panel, the mobile device is held on the hard back panel by the two guard flanges. However, when forcing the mobile device in between the two guard flanges, the mobile device can be scratched by the two guard flanges, and the two guard flanges can easily be forced to break.

SUMMARY OF THE INVENTION

The present invention has been accomplished under the circumstances in view. It is therefore the main object of the present invention to provide a mobile device protection case, which is partially elastically deformable for easy insertion of a mobile device in the case body thereof without scratching.

To achieve this and other objects of the present invention, a mobile device protection case comprises a case body and an adapter member. The case body comprises a bottom wall, a first upright peripheral wall upwardly extended from the bottom wall around the border thereof and exhibiting a U-shaped profile, a first retaining flange transversely extended from the topmost edge of the first upright peripheral wall and suspending above the bottom wall, and an accommodation chamber surrounded by the bottom wall and the first upright peripheral wall. The adapter member is made from a flexible material, comprising an abutment wall abutted against one end of the bottom wall of the case body in a flush manner, a second upright peripheral wall upwardly extended from the abutment wall along the border area thereof and abutted against the first upright peripheral wall in a flush manner, a second retaining flange transversely inwardly extended from the topmost edge of the second upright peripheral wall and abutted against the first retaining flange in a flush manner, and a mating chamber surrounded by the butment wall and the second upright peripheral wall and disposed in communication with the accommodation chamber. In application, curve the abutment wall of the adapter member downward to open one end of the accommodation chamber, and then insert the mobile device into the accommodation chamber to let the first upright peripheral wall cover the peripheral edge of the mobile device and the first retaining flange be attached to the border area of the top surface of the mobile device. Thereafter, release the pressure from the abutment wall of the adapter member, enabling the adapter member to return to its former shape elastically. At this time, the second upright peripheral wall covers the peripheral edge of the mobile device and the second retaining flange is stopped at the border area of the top surface of the mobile device, and thus, the mobile device is firmly held in the accommodation chamber of the case body and the mating chamber of the adapter member and well protected by the case body and the adapter member.

DETAILED DESCRIPTION OF THE PREFERRED EMBODIMENT

Figure 1:
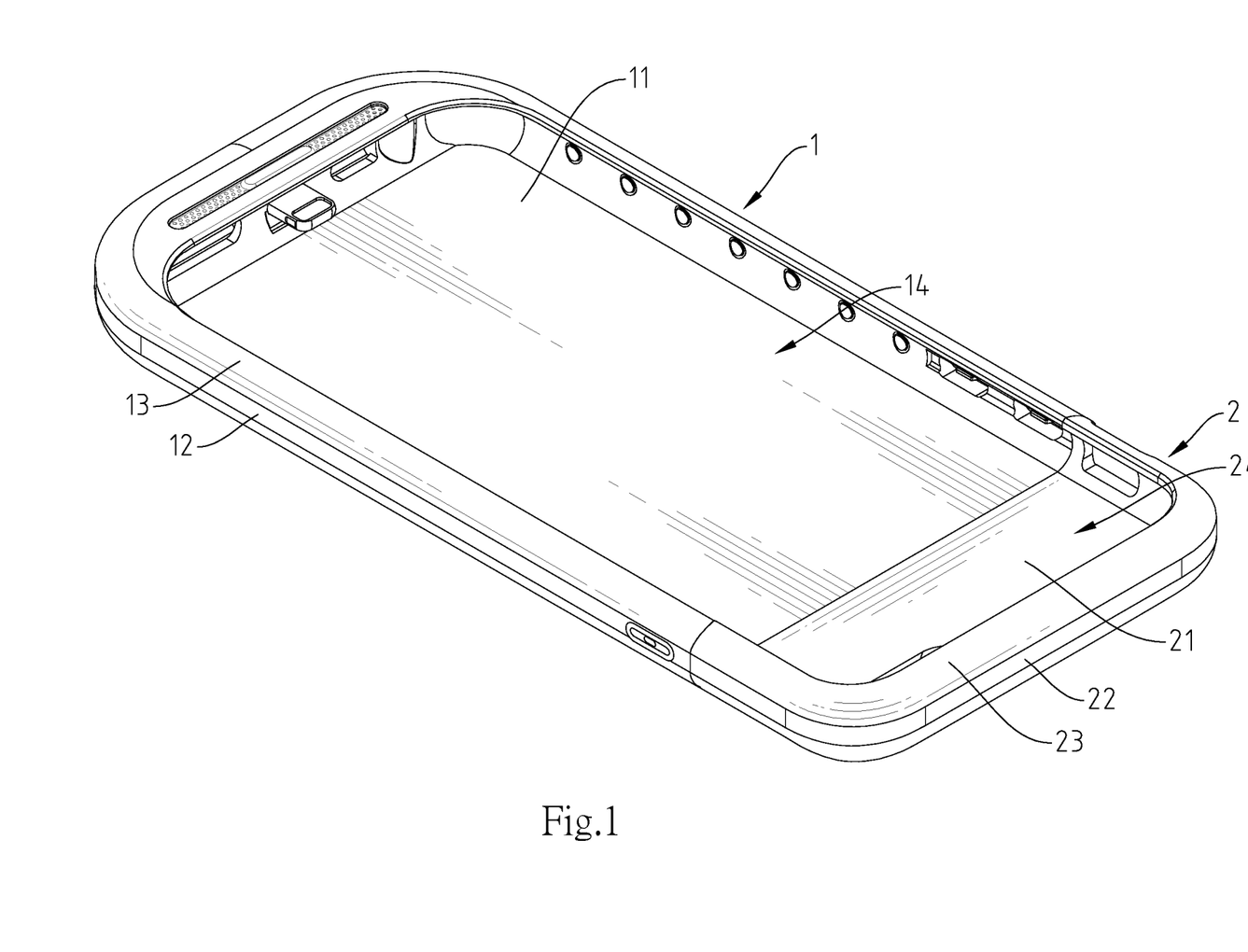
FIG. 1 is an oblique top elevational view of a mobile device protection case in accordance with a first embodiment of the present invention.
Figure 2:
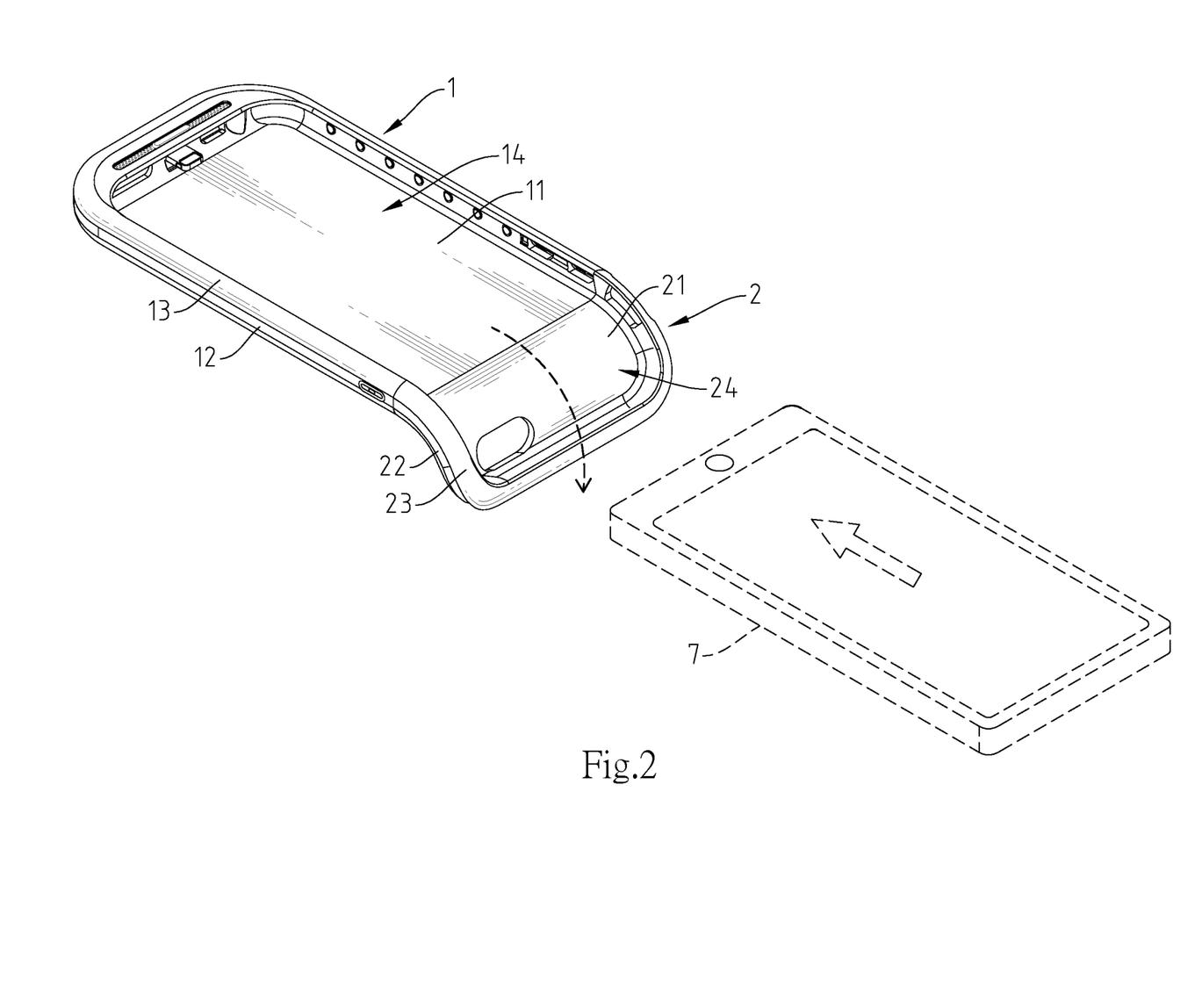
FIG. 2 is a schematic drawing illustrating an application status of the mobile device protection case in accordance with the first embodiment of the present invention.
Figure 3:
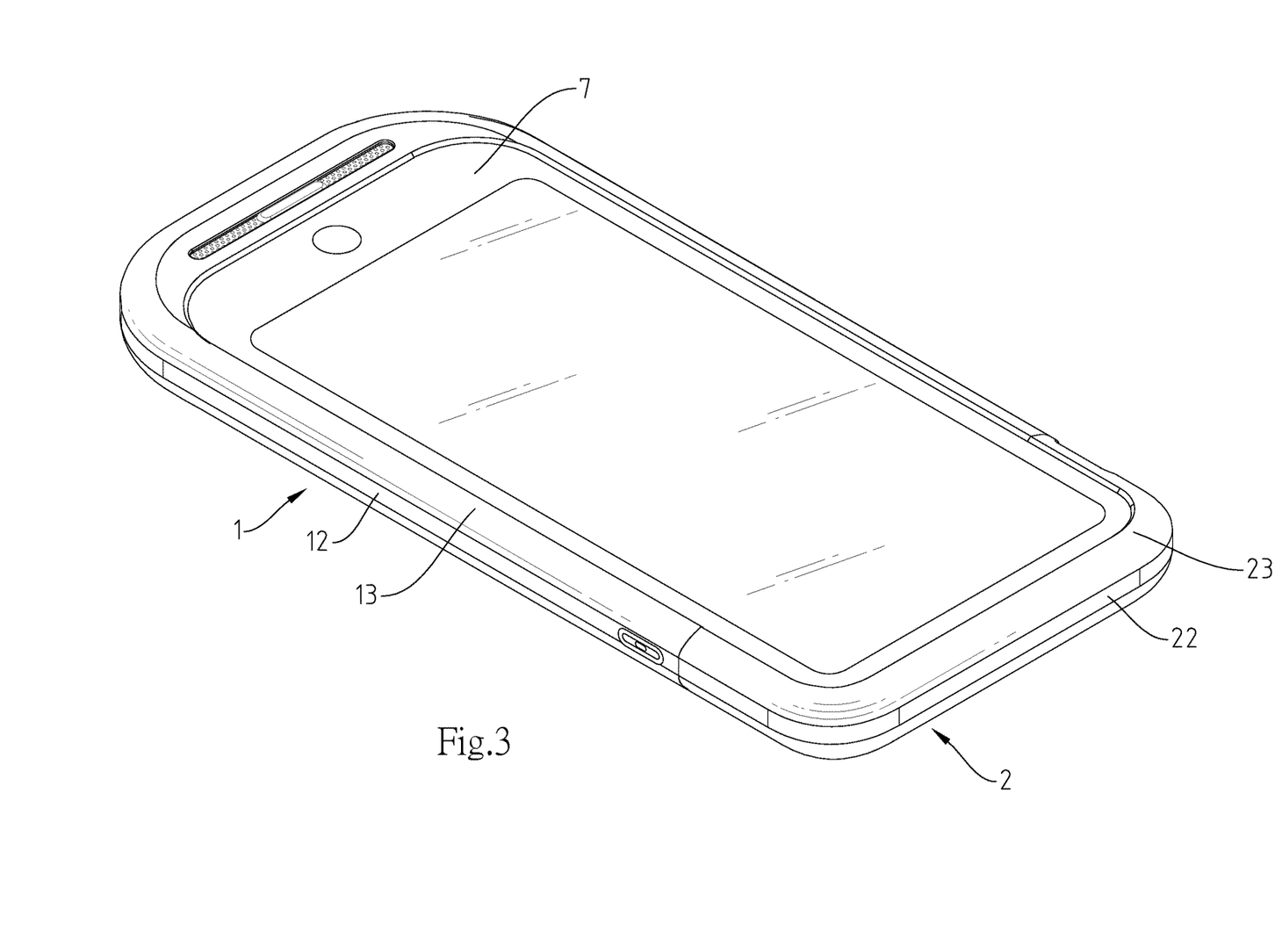
FIG. 3 is an applied view of the first embodiment of the present invention, illustrating a mobile device held in the mobile device protection case.

Referring to FIGS. 1-3, a mobile device protection case in accordance with a first embodiment of the present invention is shown. The mobile device protection case comprises a light guide plate 1 and a light source 2.

The case body 1 is made from a hard material, comprising a bottom wall 11, a first upright peripheral wall 12 of a substantially U-shaped profile upwardly extended from the bottom wall 11 along the border area thereof, a first retaining flange 13 transversely inwardly extended from the topmost edge of the first upright peripheral wall 12 and suspending above the bottom wall 11, and an accommodation chamber 14 surrounded by the bottom wall 11 and the first upright peripheral wall 12.

The adapter member 2 is made from a flexible material (such as rubber, silicon rubber) and integrally formed on the case body 1 by insert molding, comprising an abutment wall 21 abutted against one end of the bottom wall 11 in a flush manner, a second upright peripheral wall 22 of a substantially U-shaped profile upwardly extended from the abutment wall 21 along the border area thereof and abutted with two opposite ends thereof against respective opposite ends of the first upright peripheral wall 12, a second retaining flange 23 transversely inwardly extended from the topmost edge of the second upright peripheral wall 22 and abutted against the first retaining flange 13, and a mating chamber 24 surrounded by the butment wall 21 and the second upright peripheral wall 22 and disposed in communication with the accommodation chamber 14.

Referring to FIGS. 2 and 3 again, in application, curve the abutment wall 21 of the adapter member 2 downward to open one end of the accommodation chamber 14 of the case body 1, and then insert the mobile device 7 (such as: smart phone, PDA, notebook) into the accommodation chamber 14 to let the first upright peripheral wall 12 cover the peripheral edge of the mobile device 7 and the first retaining flange 13 be attached to the border area of the top surface of the mobile device 7, and then release the pressure from the abutment wall 21 of the adapter member 2, enabling the adapter member 2 to return to its former shape subject to the elastic restoring energy of the material property of the adapter member 2. At this time, the user can set the mobile device 7 in the mating chamber 24 of the adapter member 2 in position, enabling the second upright peripheral wall 22 to cover the peripheral edge of the mobile device 7 and the second retaining flange 23 to be stopped at the border area of the top surface of the mobile device 7, and thus, the mobile device 7 is firmly held in the accommodation chamber 14 of the case body 1 and the mating chamber 24 of the adapter member 2 and well protected by the case body 1 and the adapter member 2.

Figure 4:
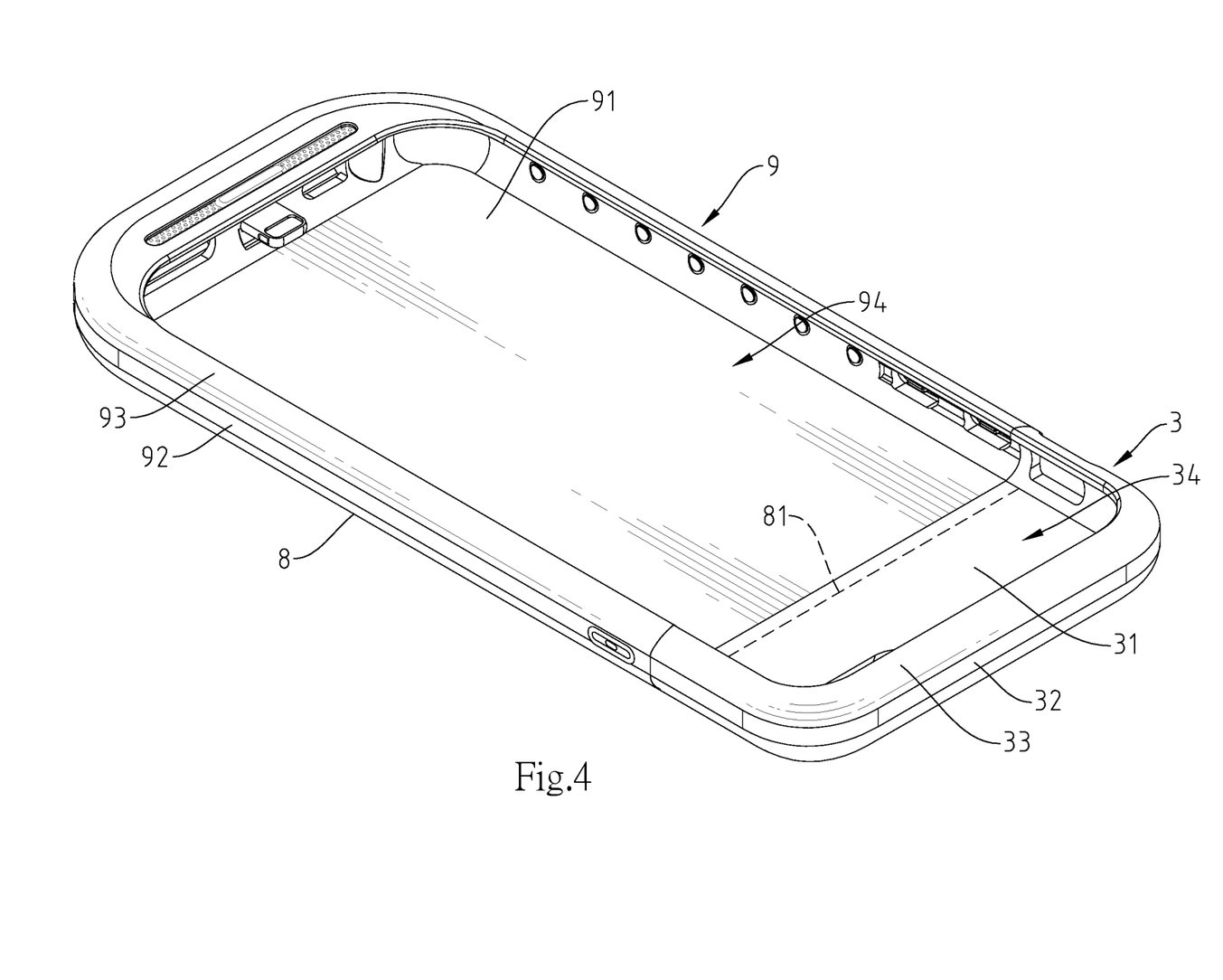
FIG. 4 is an oblique elevational view of a mobile device protection case in accordance with a second embodiment of the present invention.
Figure 5:
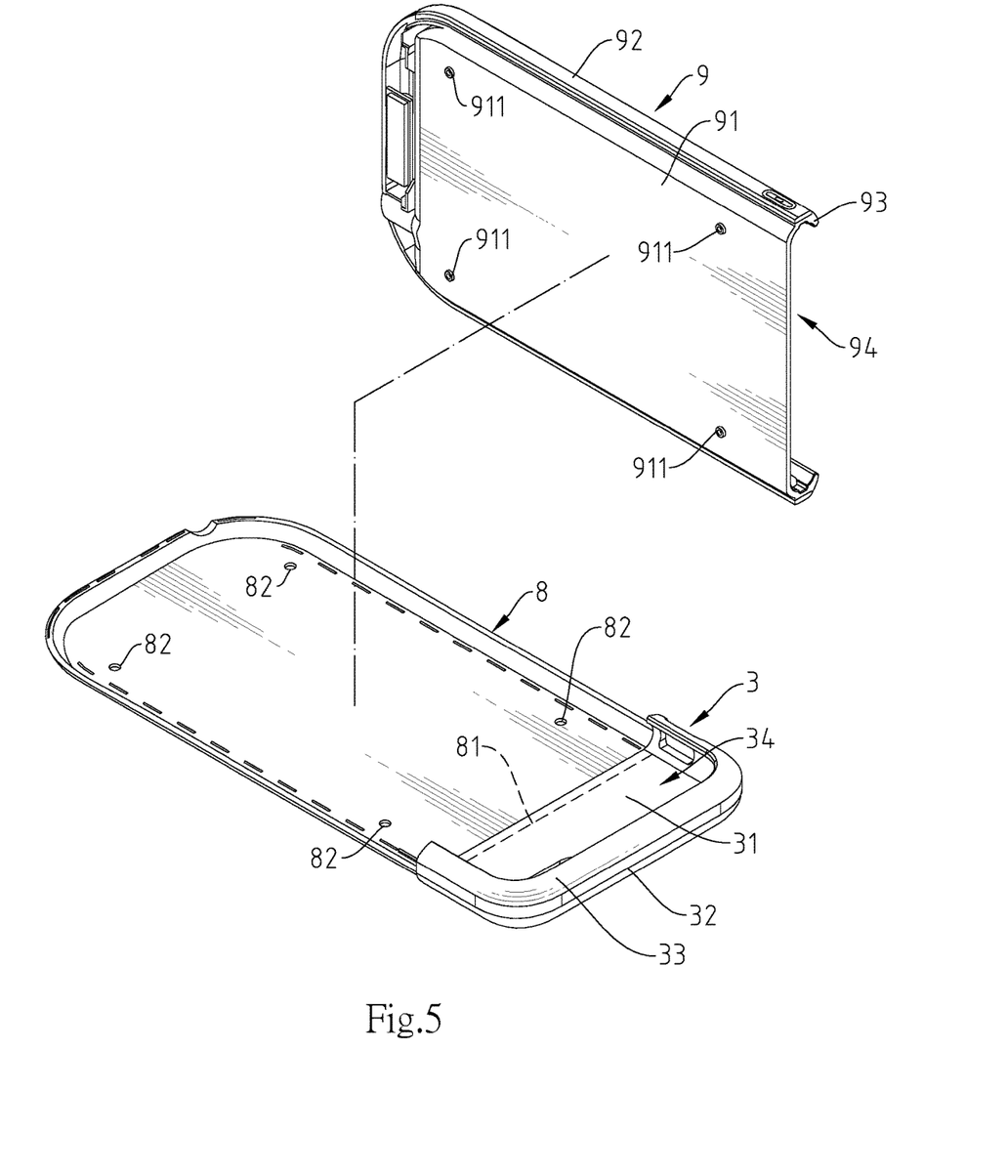
FIG. 5 is an exploded view of the mobile device protection case in accordance with the second embodiment of the present invention.
Figure 6:
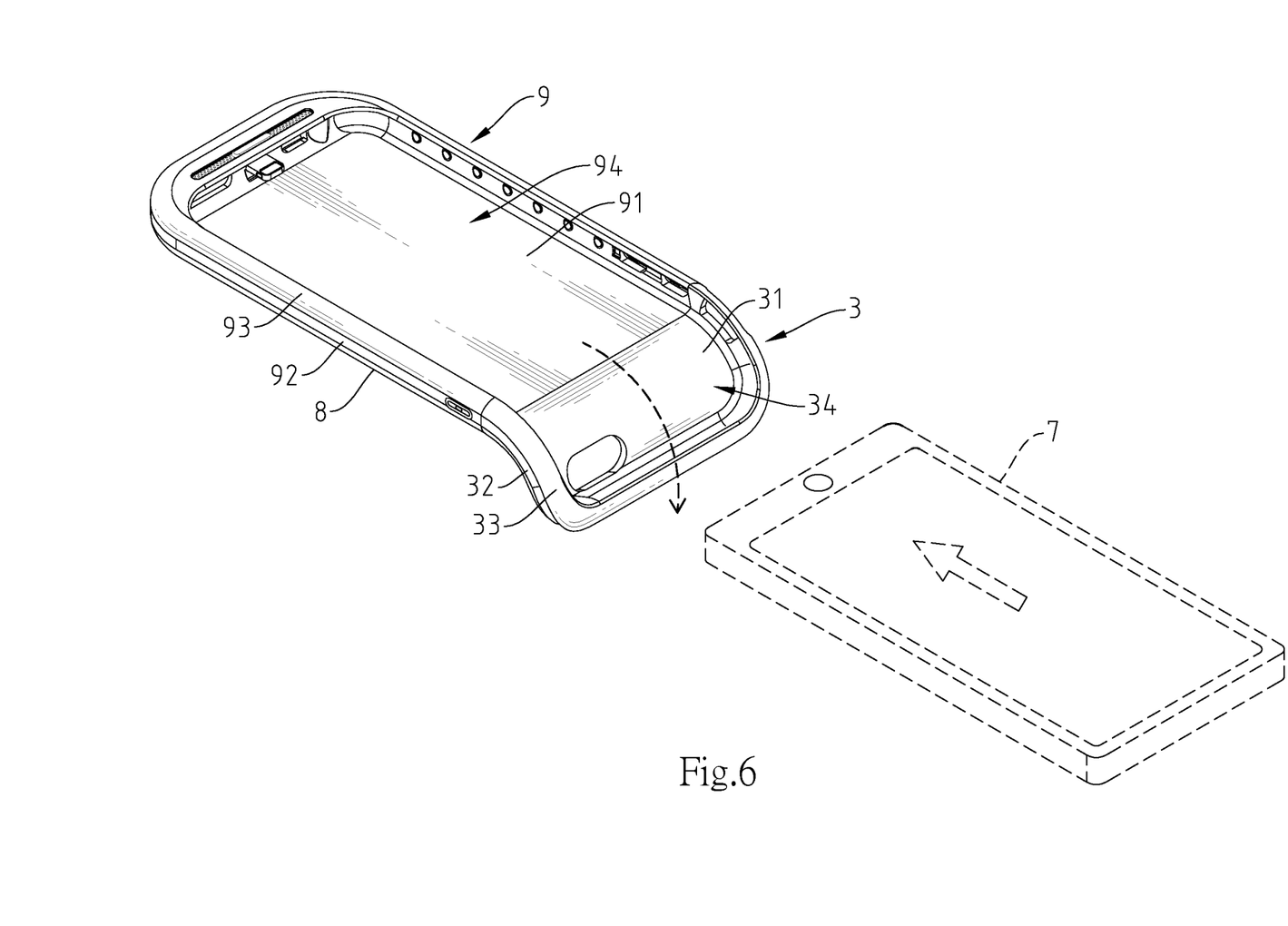
FIG. 6 is a schematic drawing illustrating an application status of the mobile device protection case in accordance with the second embodiment of the present invention.
Figure 7:
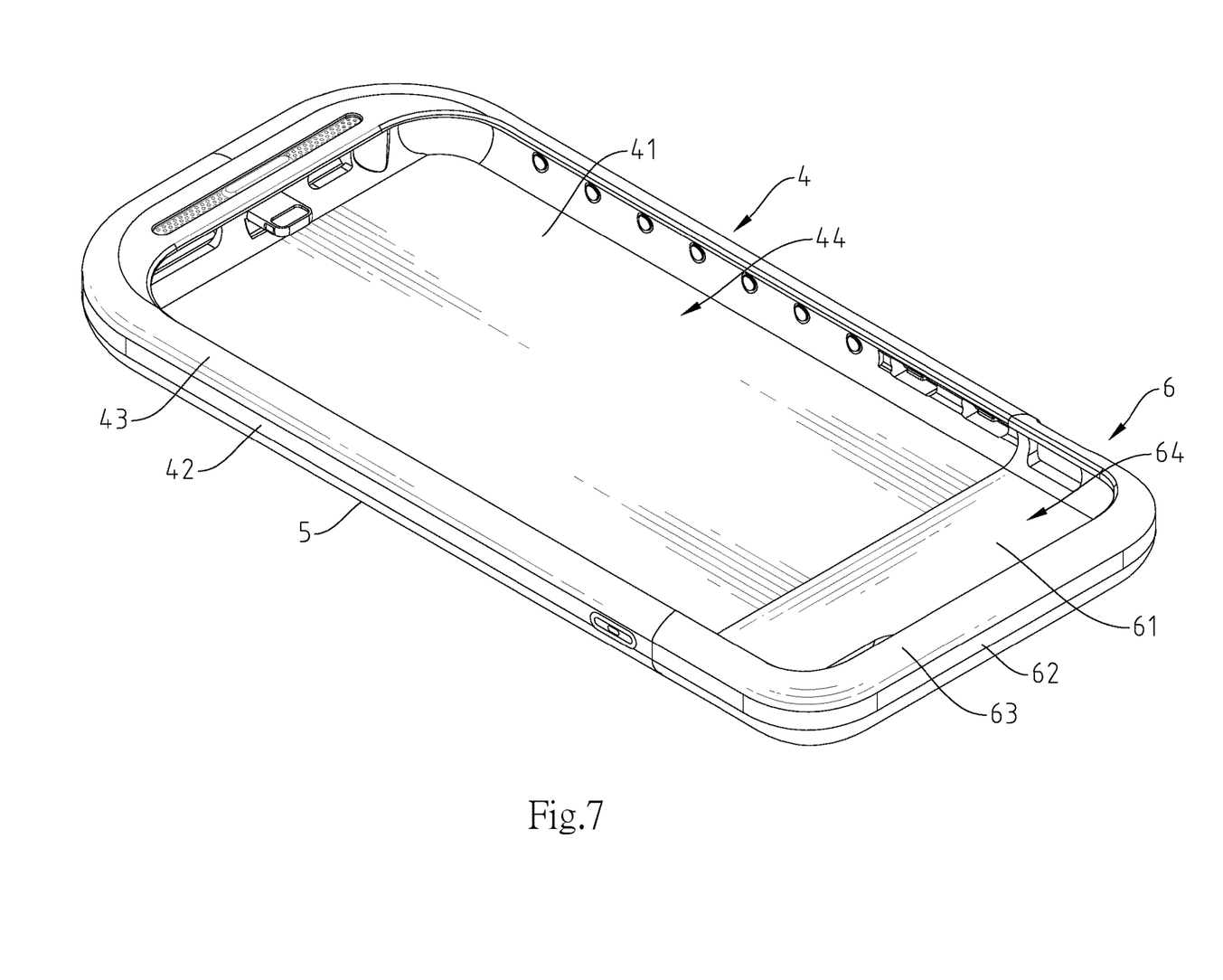
FIG. 7 is an oblique top elevational view of a mobile device protection case in accordance with a third embodiment of the present invention.
Figure 8:
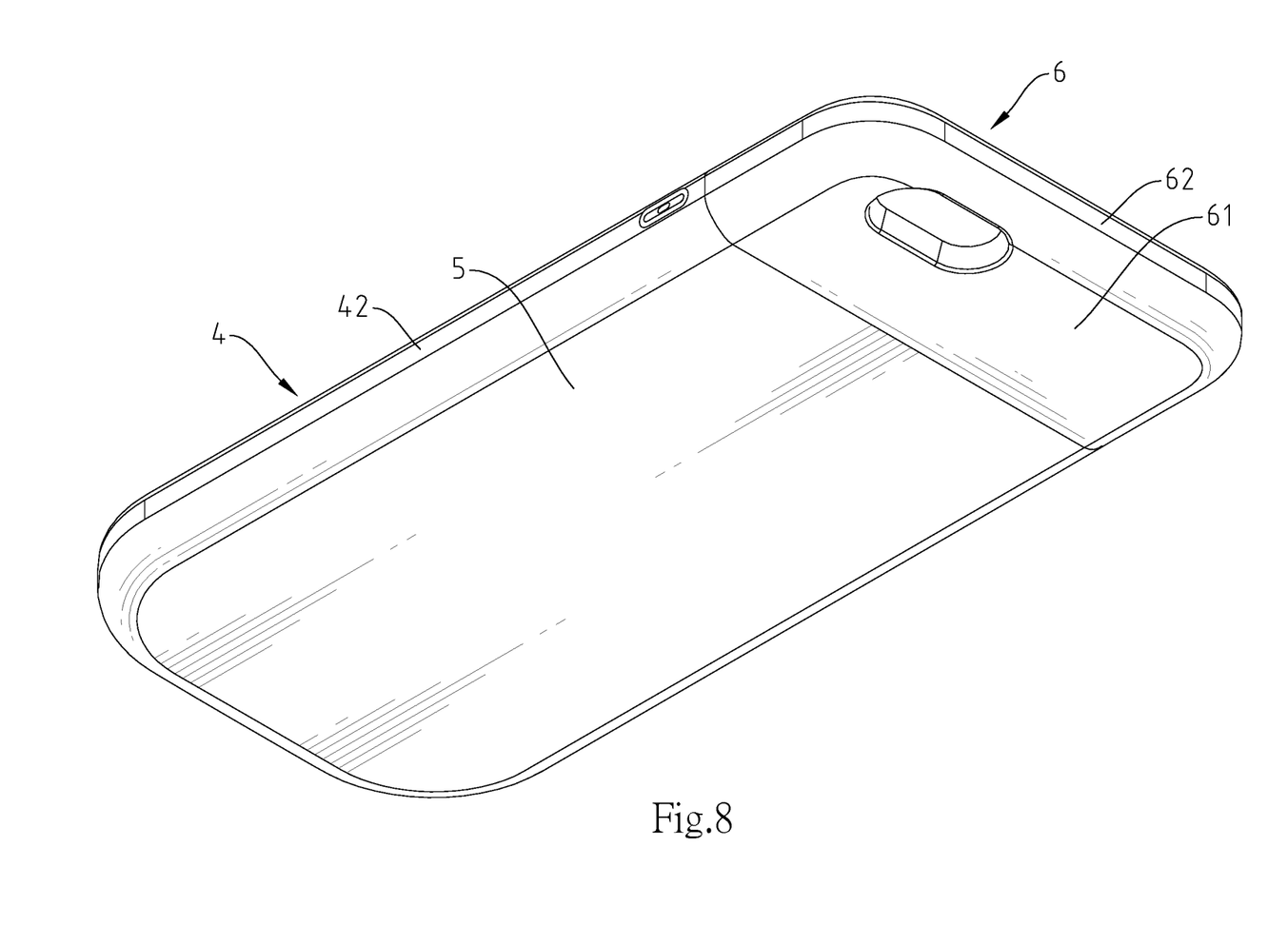
FIG. 8 is an oblique bottom elevational view of the mobile device protection case in accordance with the third embodiment of the present invention.
Figure 9:
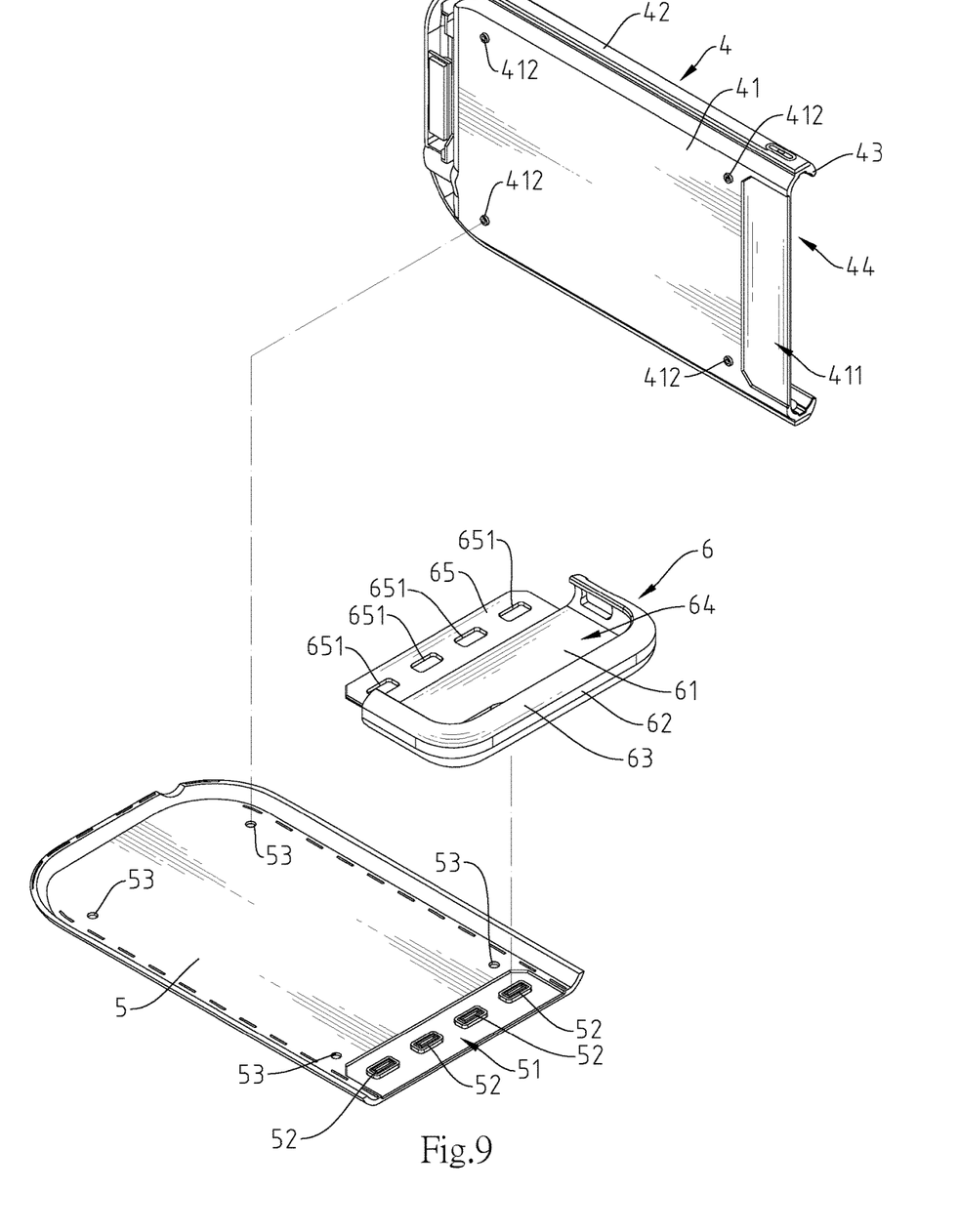
FIG. 9 is an exploded view of the mobile device protection case in accordance with the third embodiment of the present invention.

Referring to FIGS. 4-6, a mobile device protection case in accordance with a second embodiment of the present invention is shown. The mobile device protection case of this second embodiment comprises a case body 9, an adapter member 3 and a back cover 8. The back cover 8 comprises a bonding end 81 bonded to one end of the abutment wall 31 during injection molding of the adapter member 3, and is configured to cover the bottom wall 91 of the case body 9 beyond the first upright peripheral wall 92. Further, the bottom wall 91 has a plurality of raised portion 911 protruded from a bottom surface thereof; the back cover 8 has a plurality of recessed portions 82 corresponding to the raised portions 911. By forcing the respective raised portions 911 into engagement with the respective recessed portion 82, the back cover 8 is positively secured to and covered on the bottom wall 91 of the case body 9.

Referring to FIG. 6 again, when using the mobile device protection case, curve the abutment wall 31 of the adapter member 3 downwards, and then insert the mobile device 7 into the accommodation chamber 94 to let the peripheral edge of the mobile device 7 be covered by the first upright peripheral wall 92, and the release the pressure from the abutment wall 31 of the adapter member 3, enabling the peripheral edge of the mobile device 7 to be surrounded by the first upright peripheral wall 92 and the second upright peripheral wall 32 and the border area of the top surface of the mobile device 7 to be held down by the first retaining flange 93 and the second retaining flange 33, and thus, the mobile device 7 is well protected by the case body 9 and the adapter member 3.

Referring to FIGS. 7-10, a mobile device protection case in accordance with a third embodiment of the present invention is shown. Similar to the aforesaid second embodiment, the mobile device protection case of this third embodiment comprises a case body 4, an adapter member 6 abutted to one end of the case body 4, and a back cover 5 covering the case body 4 at a bottom side. The back cover 5 is capped on the bottom wall 41 of the case body 4 behond the first upright peripheral wall 42 of the case body 4; the bottom wall 41 of the case body 4 has the multiple raised portions 412 thereof respectively forced into engagement with respective recessed portions 53 of the back cover 5. The main feature of this third embodiment is outlined hereinafter. As illustrated, the bottom wall 41 of the case body 4 of this third has a first positioning recess 411 located on a bottom surface at one end thereof; the back cover 5 further comprises a second positioning recess 51 facing toward the first positioning recess 411, and a plurality of engagement blocks 52 located at the second positioning recess 51; the adapter member 6 further comprises a positioning flange 65 extended from the abutment wall 61 and set in between the first positioning recess 411 of the case body 4 and the second positioning recess 51 of the back cover 5, and a plurality of locating holes 651 respectively forced into engagement with the engagement blocks 52 of the back cover 5.

Figure 10:
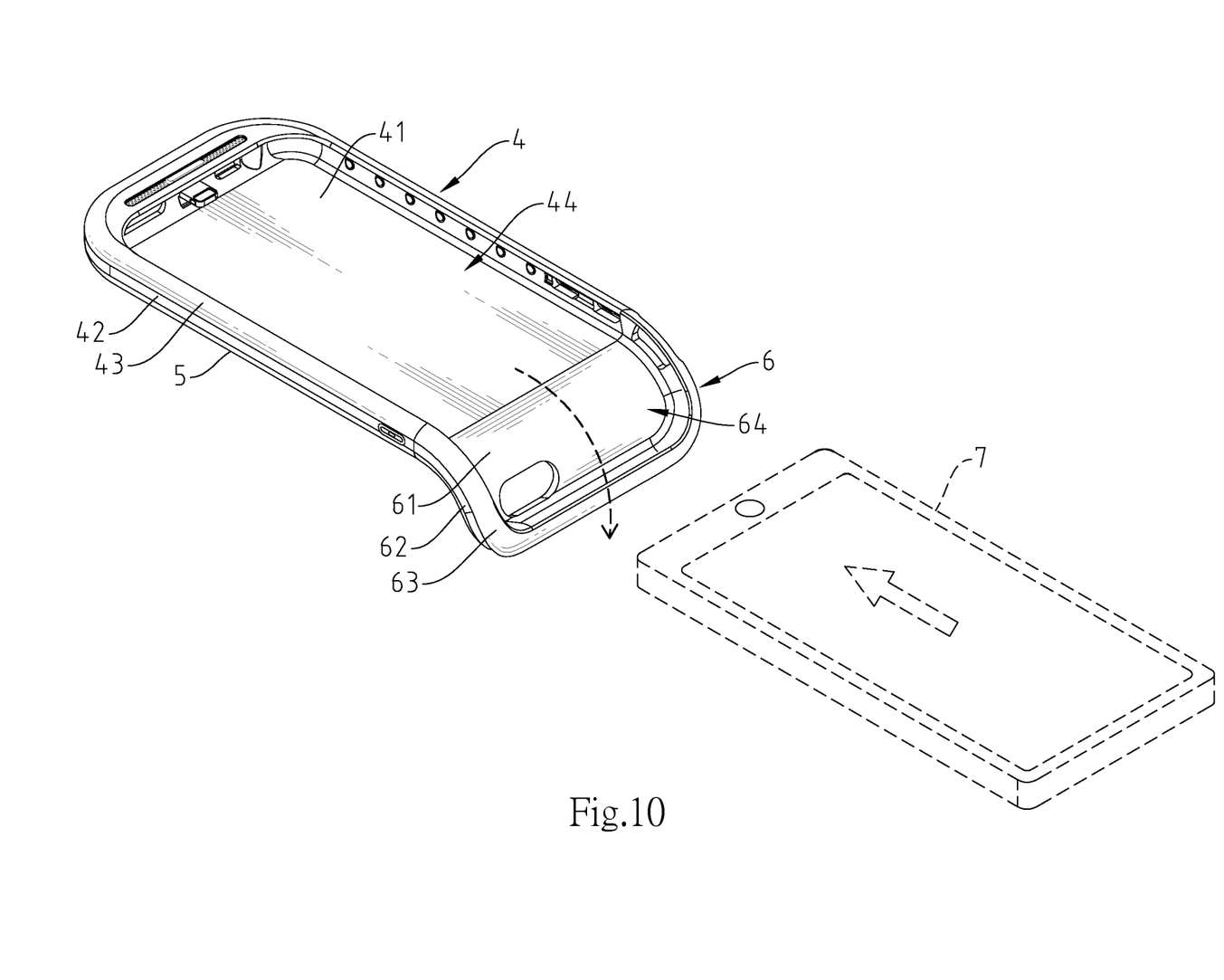
FIG. 10 is a schematic drawing illustrating an application status of the mobile device protection case in accordance with the third embodiment of the present invention.

When using the mobile device protection case of this third embodiment, curve the abutment wall 61 of the adapter member 6 downwards, and then insert the mobile device 7 into the accommodation chamber 44 to let the peripheral edge of the mobile device 7 be surrounded by the first upright peripheral wall 42, and then release the pressure from the abutment wall 61 of the adapter member 6 for enabling the adapter member 6 to return to its former shape. At this time, the peripheral edge of the mobile device 7 is surrounded by the first upright peripheral wall 42 and the second upright peripheral wall 62 and the border are of the top surface of the mobile device 7 is held down by the first retaining flange 43 and the second retaining flange 63, and thus, the mobile device 7 is well protected by the case body 4 and the adapter member 6.

In conclusion, the mobile device protection case of the invention has the advantages and features as follows:

(1) Subject to the arrangement of the flexible adapter member (2,3,6) at one end of the case body (1,4,9), the adapter member (2,3,6) can be elastically curved to open one end of the accommodation chamber (14,44,94) of the case body (1,4,9) for the insertion of the mobile device 7 into the inside of the case body (1,4,9) without scratching the furface of the mobile device 7.

(2) The back cover 8 comprises a bonding end 81 formed integral with one end of the abutment wall 31 by insert molding, preventing separation between the case body 9 and the adapter member 3 upon an impact. Further, the adapter member 3 can be separately made and then assembled with the case body, facilitating fabrication and lowering the manufacturing cost.

(3) The invention has the adapter member 6 be clamped between the case body 4 and the back cover 5; the adapter member 6 can be separately made and then assembled with the case body 4 and the back cover 5. After the mobile device protection is assembled, the case case body 4 and the adapter member 6 are firmly secured together and prohibited from separation upon an accidental impact.

What is claimed is:

1. A mobile device protection case, comprising:
   a case body comprising a bottom wall, a first upright peripheral wall upwardly extending from said bottom wall around a border thereof and having a U-shaped profile, a first retaining flange transversely extending from a topmost edge of said first upright peripheral wall and disposed above said bottom wall, an accommodation chamber surrounded by said bottom wall and said first upright peripheral wall; and an adapter member made from a flexible material, said adapter member comprising an abutment wall flushly abutting an end of said bottom wall of said case body, a second upright peripheral wall upwardly extending from said abutment wall along a border area thereof and flushly abutting said first upright peripheral wall, a second retaining flange transversely inwardly extending from a topmost edge of said second upright peripheral wall and flushly abutting said first retaining flange, a mating chamber surrounded by said abutment wall and said second upright peripheral wall and disposed in communication with said accommodation chamber.

2. The mobile device protection case as claimed in claim 1, further comprising a back cover fixedly connected to said adapter member and covered on a bottom side of said case body, wherein said back cover comprises a bonding end bonded to said abutment wall by insert molding, and a plurality of recessed portions are located at a top surface thereof; wherein said case body further comprises a plurality of raised portions protruding from a bottom surface thereof and respectively forced into engagement with said recessed portions of said back cover.

3. The mobile device protection case as claimed in claim 1, further comprising a back cover attached to a bottom side of said case body over said said bottom wall, said back cover comprising a positioning flange set in between said bottom wall of said case body and said back cover.

4. The mobile device protection case as claimed in claim 3, wherein said case body further comprises a first positioning recess located at one end of a bottom surface of said bottom wall; said back cover comprises a second positioning recess corresponding to said first positioning recess, and a plurality of engagement blocks are located in said second positioning recess; said adapter member further comprises a plurality of locating holes located at said positioning flange and respectively forced into engagement with said engagement blocks to position said positioning flange in said first positioning recess and said second positioning recess between said bottom wall of said case body and said back cover.

5. The mobile device protection case as claimed in claim 3, wherein said back cover comprises a plurality of recessed portions located at a top surface thereof; said case body further comprises a plurality of raised portion protruding from a bottom surface thereof and respectively forced into engagement with said recessed portions of said back cover.

6. The mobile device protection case as claimed in claim 1, wherein said adapter member is made from silicon rubber.

7. The mobile device protection case as claimed in claim 1, wherein said adapter member is made from rubber.

8. The mobile device protection case as claimed in claim 1, wherein said case body is made from a hard material.

* * * * *